(12) United States Patent
Tao et al.

(10) Patent No.: US 11,975,751 B2
(45) Date of Patent: May 7, 2024

(54) ITERATIVE LEARNING CONTROL METHOD FOR MULTI-PARTICLE VEHICLE PLATOON DRIVING SYSTEM

(71) Applicant: Jiangnan University, Wuxi (CN)

(72) Inventors: Hongfeng Tao, Wuxi (CN); Longhui Zhou, Wuxi (CN); Zhihe Zhuang, Wuxi (CN); Yande Huang, Wuxi (CN); Junyu Wei, Wuxi (CN); Rui Wang, Wuxi (CN)

(73) Assignee: Jiangnan University, Wuxi (CN)

( * ) Notice: Subject to any disclaimer, the term of this patent is extended or adjusted under 35 U.S.C. 154(b) by 0 days.

(21) Appl. No.: 17/986,431

(22) Filed: Nov. 14, 2022

(65) Prior Publication Data

US 2023/0078812 A1  Mar. 16, 2023

Related U.S. Application Data

(63) Continuation of application No. PCT/CN2022/084301, filed on Mar. 31, 2022.

(30) Foreign Application Priority Data

Jun. 18, 2021 (CN) .......................... 202110680017.6

(51) Int. Cl.
B61L 25/02  (2006.01)
(52) U.S. Cl.
CPC ......... *B61L 25/021* (2013.01); *B61L 2201/00* (2013.01)
(58) Field of Classification Search
CPC .................... B61L 25/021; B61L 2201/00
See application file for complete search history.

(56) References Cited

U.S. PATENT DOCUMENTS

2017/0309187 A1* 10/2017 Lin ...................... G05D 1/0293

FOREIGN PATENT DOCUMENTS

CN   101846979 A   9/2010
CN   109031958 A   12/2018
(Continued)

OTHER PUBLICATIONS

Liu et al, G., Adaptive Iterative Learning Control for Subway Trains Using Multiple-Point-Mass Dynamic Model Under Speed Constraint, Google Scholar, IEEE Transactions on Intelligent Transportation Systems, vol. 22, No. 3, Mar. 2021. pp. 1388-1400. (Year: 2021).*

(Continued)

*Primary Examiner* — Russell Frejd
(74) *Attorney, Agent, or Firm* — Nitin Kaushik

(57) ABSTRACT

The present invention discloses an iterative learning control (ILC) method for a multi-particle vehicle platoon driving system, and relates to the field of ILC. The method includes: firstly, discretizing a multi-particle train dynamic equation using a finite difference method to obtain a partial recurrence equation, and then transforming the partial recurrence equation into a spatially interconnected system model; secondly, transforming the spatially interconnected system model into an equivalent one-dimensional dynamic model using a lifting technology, and in order to compensate input delay, designing an ILC law based on a state observer; and thirdly, transforming a controlled object into an equivalent discrete repetitive process according to the ILC law, and converting a controller combination problem into a linear matrix inequality based on stability analysis of the repetitive process. The method is simple and easy to implement, considers structure uncertainty of the system, and has a good control performance and robustness.

1 Claim, 10 Drawing Sheets

(56) References Cited

FOREIGN PATENT DOCUMENTS

| CN | 110032066 A | 7/2019 | | |
|---|---|---|---|---|
| CN | 111158349 A | 5/2020 | | |
| WO | WO-2021057583 A1 | * | 4/2021 | .......... B60W 30/165 |
| WO | WO-2021115282 A1 | * | 6/2021 | .......... B60W 30/143 |

OTHER PUBLICATIONS

Gong et al, S., Cooperative Platoon Control for a Mixed Traffic Flow Including Human Drive Vehicles and Connected and Autonomous Vehicles, Google Scholar, Transportation Research Part B, 2018, pp. 25-61. (Year: 2018).*

* cited by examiner

ITERATIVE LEARNING CONTROL METHOD FOR MULTI-PARTICLE VEHICLE PLATOON DRIVING SYSTEM

CROSS-REFERENCE TO RELATED APPLICATIONS

The application claims priority to Chinese patent application No. 202110680017.6, filed on Jun. 18, 2021, the entire contents of which are incorporated herein by reference.

TECHNICAL FIELD

The present invention relates to the field of iterative learning control (ILC), and particularly to an ILC method for a multi-particle vehicle platoon driving system, which is used for multi-particle vehicle platoon driving systems with structure uncertainty and input delay.

BACKGROUND

In recent years, with a rapid development of railways, an efficient travel mode of trains is popular with people. A multi-particle vehicle platoon driving system is a spatially interconnected system formed by coupling a plurality of train carriages to each other and has characteristics of time-space coupling, a large number of variables and a high dimension. On the premise of guaranteeing safe operation of the trains, an improvement on an operation speed and performance of the trains in limited time and trials becomes a focus. However, due to a complex operation environment of the trains, the system always has uncertainty in practice. Furthermore, information interaction transmission exists in control implementation, and input delay is usually involved, resulting in delay in output response of the system to affect stability and a performance of the system. In view of operation characteristics of the multi-particle vehicle platoon driving system, ILC is used to solve a tracking problem of the multi-particle vehicle platoon driving system.

ILC is a new intelligent control method which can improve a tracking performance of the controlled system in limited time by repeatedly learning from previous trials. ILC has most remarkable characteristics of a small calculated amount, low requirements for prior knowledge of system dynamics, simplicity and implementation easiness. In the present application, application of ILC to the multi-particle vehicle platoon driving system with uncertainty and input delay may increase a response speed and trajectory tracking precision of the system and improve a control performance.

SUMMARY

In view of the above problems and technical demands, the inventor proposes an ILC method for a multi-particle vehicle platoon driving system. The present invention has the following technical solution.

An ILC method for a multi-particle vehicle platoon driving system includes the following steps:

step 1: establishing a spatially interconnected system model of the multi-particle vehicle platoon driving system;

wherein a dynamic equation of the multi-particle vehicle platoon driving system is described as $$m\ddot{x}_i(\tilde{t}) = k(x_{i+1}(\tilde{t}) - x_i(\tilde{t})) - k(x_i(\tilde{t}) - x_{i-1}(\tilde{t})) + u_i(\tilde{t} - \tau) \quad (1)$$
$$y_i(\tilde{t}) = \dot{x}_i(\tilde{t})$$

wherein $x_i(\tilde{t})$ represents a position of an ith train, $u_i(\tilde{t})$ is control input and represents traction of the train, $\tau$ is a time-delay constant caused by signal transmission, $y_i(\tilde{t})$ is measurement output and represents a speed of the train, m denotes mass of each train and has a variation range $\pm\bar{\omega}_m$, and k is a spring coefficient and has a variation range $\pm\bar{\omega}_k$;

sampling time T is selected, and the equation (1) is approximately discretized using a finite difference method; that is, $$(\dot{x}_i(\tilde{t}))_{t,s} = \frac{x_1(t+1,s) - x_1(t,s)}{T},$$
$$(\ddot{x}_i(\tilde{t}))_{t,s} = \frac{x_2(t+1,s) - x_2(t,s)}{T}$$

wherein t and s are discrete time and a train serial number respectively, and substitution of the above formula into the equation (1) gives a partial recurrence equation:

$$x_1(t+1,s) = x_1(t,s) + Tx_2(t,s) \quad (2)$$
$$x_2(t+1,s) =$$
$$-2\frac{kT}{m}x_1(t,s) + x_2(t,s) + \frac{kT}{m}x_1(t,s+1) + \frac{kT}{m}x_1(t,s-1) + \frac{T}{m}u(t-\tau,s)$$
$$y(t,s) = x_2(t,s)$$

assuming that information transferred between the trains is their position information, that is, interconnected variables are set as: $w_+(t,s) = w_-(t,s) = x_1(t,s)$, $v_+(t,s) = x_1(t,s-1)$, and $v_-(t,s) = x_1(t,s+1)$, and an output variable is set as: $y(t,s) = x_2(t,s)$, the equation (2) is transformed into an uncertain spatially interconnected system model, i.e., $$\begin{bmatrix} x(t+1,s) \\ w(t,s) \\ q(t,s) \\ y(t,s) \end{bmatrix} = \begin{bmatrix} A_{11}^s & A_{12}^s & B_{11}^s & B_{11}^s \\ A_{21}^s & 0 & 0 & 0 \\ C_{11}^s & C_{12}^s & D_{11}^s & D_{12}^s \\ C_{21}^s & 0 & 0 & 0 \end{bmatrix} \begin{bmatrix} x(t,s) \\ v(t,s) \\ p(t,s) \\ u(t-\tau,s) \end{bmatrix} \quad (3)$$

wherein $$A_{11}^s = \begin{bmatrix} 1 & T \\ -2\frac{kT}{m} & 1 \end{bmatrix}, A_{12}^s = \begin{bmatrix} 0 & 0 \\ \frac{kT}{m} & \frac{kT}{m} \end{bmatrix}, A_{21}^s \begin{bmatrix} 1 & 0 \\ 1 & 0 \end{bmatrix},$$

$$B_{11}^s = \begin{bmatrix} 0 & 0 \\ \frac{T}{m} & -\frac{T}{m} \end{bmatrix}, B_{12}^s = \begin{bmatrix} 0 \\ \frac{T}{m} \end{bmatrix}, C_{11}^s = \begin{bmatrix} -2\bar{\omega}_k & 0 \\ -2\frac{\bar{\omega}_m k}{m} & 0 \end{bmatrix},$$

$$C_{12}^s = \begin{bmatrix} \bar{\omega}_k & \bar{\omega}_k \\ \frac{\bar{\omega}_m k}{m} & \frac{\bar{\omega}_m k}{m} \end{bmatrix}, C_{21}^s = [0 \ 1], D_{11}^s = \begin{bmatrix} 0 & 0 \\ \frac{\bar{\omega}_m}{m} & -\frac{\bar{\omega}_m}{m} \end{bmatrix},$$

$$D_{12}^s = \begin{bmatrix} 0 \\ \frac{\bar{\omega}_m}{m} \end{bmatrix}$$

in the above formula, $x(t,s) \in R^n$, $u(t,s) \in R^q$ and $y(t,s) \in R^m$ represent state, input and output variables of an sth subsystem respectively; $\tau(0 < \tau < \alpha)$ denotes the time-delay constant;

$$w(t,s) = [w_+^T(t,s) \quad w_-^T(t,s)]^T \quad \text{and} \quad v(t,s) = [v_+^T(t,s) \quad v_-^T(t,s)]^T$$

represent interconnection between adjacent subsystems, and satisfy $$w_+(s)=v_+(s+1)$$

$$w_-(s)=v_-(s-1) \quad (4)$$

boundary conditions thereof are set as: $v_+(1)=w_-(1)=0$ and $v_-(n)=w_+(n)=0$, and n is a number of the subsystems;

p(t,s) denotes a pseudo-input channel of structure uncertainty, q(t,s) denotes a pseudo-output channel of the structure uncertainty, and $$p(t,s)=\theta_s q(t,s) \quad (5)$$

wherein an uncertainty block is:

$$\theta_s = \text{diag}\{\delta_1 I_{r_1}, \ldots, \delta_f I_{r_f}\},\ \delta_i \in R,\ |\delta_i| \leq 1,\ i=1,\ldots,f;$$

$\delta_i$ describes a variation of a dynamic parameter of the system, and $I_{r_f}$ is a unit matrix with a dimension of $r_f$;

step 2: transforming the spatially interconnected system model;

wherein the model (3) is transformed into an equivalent one-dimensional dynamic model using a lifting technology, and lifting vectors are defined as follows:

$X(t)=[x(t,1)^T, x(t,2)^T, \ldots, x(t,n)^T]^t$
$V(t)=[v(t,1)^T, v(t,2)^T, \ldots, v(t,n)^T]^t$
$W(t)=[w(t,1)^T, w(t,2)^T, \ldots, w(t,n)^T]^t$
$P(t)=[p(t,1)^T, p(t,2)^T, \ldots, p(t,n)^T]^t$
$Q(t)=[q(t,1)^T, q(t,2)^T, \ldots, q(t,n)^T]^t$
$U(t-\tau)=[u(t-\tau,1)^T, u(t-\tau,2)^T, \ldots, u(t-\tau,n)^T]^T$
$Y(t)=[y(t,1)^T, y(t,2)^T, \ldots, y(t,n)^T]^t$ then, the whole uncertain spatially interconnected system model can be equivalently described by the following model:

$$\begin{bmatrix} X(t+1) \\ W(t) \\ Q(t) \\ Y(t) \end{bmatrix} = \begin{bmatrix} A_{11} & A_{12} & B_{11} & B_{12} \\ A_{21} & 0 & 0 & 0 \\ C_{11} & C_{12} & D_{11} & D_{12} \\ C_{21} & 0 & 0 & 0 \end{bmatrix} \begin{bmatrix} X(t) \\ V(t) \\ P(t) \\ U(t-\tau) \end{bmatrix} \quad (6)$$

wherein $A_{11} = \text{diag}\{A_{11}^1, \ldots, A_{11}^n\}$, $A_{12} = \text{diag}\{A_{12}^1, \ldots, A_{12}^n\}$, $A_{21} = \text{diag}\{A_{21}^1, \ldots, A_{21}^n\}$, $B_{11} = \text{diag}\{B_{11}^1, \ldots, B_{11}^n\}$, $B_{12} = \text{diag}\{B_{12}^1, \ldots, B_{12}^n\}$, $C_{11} = \text{diag}\{C_{11}^1, \ldots, C_{11}^n\}$ $C_{12} = \text{diag}\{C_{12}^1, \ldots, C_{12}^n\}$, $C_{21} = \text{diag}\{C_{21}^1, \ldots, C_{21}^n\}$, $D_{11} = \text{diag}\{D_{11}^1, \ldots, D_{11}^n\}$, $D_{12} = \text{diag}\{D_{12}^1, \ldots, D_{12}^n\}$, the model (6) contains the interconnected variables, and therefore, the model (6) is required to be further simplified;

based on an interconnection characteristic of the formula (4) and the boundary conditions thereof, an equation relationship between the interconnected variables is obtained:

$$W(t)=\eta V(t) \quad (7)$$

wherein $\eta$ is a permutation matrix unrelated to time t; the formula (7) is substituted into (6) to obtain $$V(t)=\eta^{-1} A_{21} X(t) \quad (8)$$

and then, the formula (8) is substituted into (6) to eliminate the interconnected variables W(t) and V(t), so as to obtain the following equivalent uncertain model:

$$\begin{bmatrix} X(t+1) \\ Q(t) \\ Y(t) \end{bmatrix} = \begin{bmatrix} \overline{A}_{11} & B_{11} & B_{12} \\ \overline{C}_{11} & D_{11} & D_{12} \\ C_{21} & 0 & 0 \end{bmatrix} \begin{bmatrix} X(t) \\ P(t) \\ U(t-\tau) \end{bmatrix} \quad (9)$$

wherein $$\overline{A}_{11} = A_{11}+A_{12}\eta^{-1}A_{21}$$

$$\overline{C}_{11} = C_{11}+C_{12}\eta^{-1}A_{21}$$

according to the formula (5), the following formula is obtained:

$$P(t)=\theta Q(t) \quad (10)$$

wherein the uncertainty block is: $\theta=\text{diag}\{\theta_1, \ldots, \theta_n\}$, $\theta_i \leq I$, $i=1, \ldots, n$;

the formula (10) is substituted into (9) to obtain $$Q(t)=(I-D_{11}\theta)^{-1}(\overline{C}_{11}X(t)+D_{12}U(t-\tau)) \quad (11)$$

then, the formula (11) is substituted into (9) to eliminate uncertainty variables P(t) and Q(t) using an elimination method, so as to obtain a general-form state space model:

$$X(t+1)=(A+\Delta A)X(t)+(B+\Delta B)U(t-\tau)\ Y(t)=CX(t) \quad (12)$$

wherein $$A=\overline{A}_{11},\ B=B_{12},\ C=C_{21}$$

$$\Delta A = B_{11}\theta(I-D_{11}\theta)^{-1}\overline{C}_{11}$$

$$\Delta B = B_{11}\theta(I-D_{11}\theta)^{-1}D_{12}$$

step 3: designing an ILC law based on a state observer;

wherein the state space model (12) is described as an ILC structure form:

$$X_{k+1}(t+1)=(A+\Delta A)X_{k+1}(t)+(B+\Delta B)U_{k+1}(t-\tau)$$
$$Y_{k+1}(t)=CX_{k+1}(t) \quad (13)$$

wherein k+1 represents a current operation trial of the system, $t \in [0,\alpha]$ denotes a limited working cycle of each trial of the system, and the input-delay constant satisfies a condition: $\tau < \alpha$;

then, the ILC law is expressed as $$U_{k+1}(t)=U_k(t)+r_{k+1}(t) \quad (14)$$

the current control signal $U_{k+1}(t)$ is equal to the control signal $U_k(t)$ of a previous trial plus the update term $r_{k+1}(t)$ which is calculated from previous error information;

a system tracking error in a (k+1)th trial is $$e_{k+1}(t)=Y_r(t)-Y_{k+1}(t) \quad (15)$$

wherein $Y_r(t)$ is a desired output trajectory;

considering delay in output response, the tracking error is re-described as $$e_{k+1}(t)=Y_r(t-\tau)-Y_{k+1}(t) \quad (16)$$

a state error vector is introduced:

$$\overline{X}_{k+1}(t+1)=X_{k+1}(t)-X_k(t) \quad (17)$$

assuming that $Y_r(0)=Y_k(0)=CX_k(0)$, and $\overline{X}_k(0)=0$, that is, the system is returned to a same initial state in each trial, $$\begin{aligned}\overline{X}_{k+1}(t+1) &= X_{k+1}(t) - X_k(t) \\ &= (A+\Delta A)[X_{k+1}(t-1) - X_k(t-1)] + \\ &\quad (B+\Delta B)[U_{k+1}(t-1-\tau) - U_k(t-1-\tau)] \\ &= (A+\Delta A)\overline{X}_{k+1}(t) + (B+\Delta B)r_{k+1}(t-1-\tau)\end{aligned} \quad (18)$$

-continued and $$e_{k+1}(t) = Y_r(t-\tau) - Y_{k+1}(t) \quad (19)$$
$$= e_k(t) - C[X_{k+1}(t) - X_k(t)]$$
$$= -C(A + \Delta A)\overline{X}_{k+1}(t) - C(B + \Delta B)r_{k+1}(t-1-\tau) + e_k(t)$$

in order to compensate input delay, the following state observer is constructed based on output information in the current trial:

$$\tilde{X}_{k+1}(t+1) = A\tilde{X}_{k+1}(t) + Br_{k+1}(t-1) + L[\overline{Y}_{k+1}(t) - \tilde{Y}_{k+1}(t-\tau)] \quad (20)$$

wherein $\overline{Y}_{k+1}(t) = Y_{k+1}(t-1) - Y_k(t-1) = C\overline{X}_{k+1}(t)$, and $\tilde{X}_{k+1}(t)$ is a τ-step ahead prediction of the state $\overline{X}_{k+1}(t)$; that is, $\tilde{X}_{k+1}(t)$ is an estimation value of $\overline{X}_{k+1}(t+\tau)$; and L is observer gain to be designed;

an observation error is defined as $$\tilde{e}_{k+1}(t) = \overline{X}_{k+1}(t) - \tilde{X}_{k+1}(t-\tau) \quad (21)$$

it is assumed that the update term in the ILC law (14) is $$r_{k+1}(t) = K_1\tilde{X}_{k+1}(t+1) + K_2 e_k(t+\tau) + K_3(e_k(t+1+\tau) - e_k(t+\tau)) \quad (22)$$

wherein $K_1$, $K_2$ and $K_3$ are learning gain to be designed; the update term is formed by state feedback information and PD-type previous tracking error information, and when the learning gain $K_2$ is equal to $K_3$, the formula (22) is simplified to P-type ILC;

(22) is substituted into (20) to obtain $$\tilde{X}_{k+1}(t+1-\tau) = (A + BK_1)\tilde{X}_{k+1}(t-\tau) + LC\tilde{e}_{k+1}(t-\tau) + B(K_2 - K_3)e_k(t-1) + BK_3 e_k(t) \quad (23)$$

and $$\tilde{e}_{k+1}(t+1) = \overline{X}_{k+1}(t+1) - \tilde{X}_{k+1}(t+1-\tau) \quad (24)$$
$$= (\Delta A + \Delta BK_1)\tilde{X}_{k+1}(t-\tau) + (A + \Delta A)\tilde{e}_{k+1}(t) - LC\tilde{e}_{k+1}(t-\tau) + \Delta B(K_2 - K_3)e_k(t-1) + \Delta BK_3 e_k(t)$$

it is assumed that $$\zeta_{k+1}(t) = \left[\tilde{X}_{k+1}^T(t-\tau) \quad \tilde{e}_{k+1}^T(t)\right]^T,$$

and $K = K_2 - K_3$, so as to obtain the following linear discrete repetitive process model with time delay:

$$\zeta_{k+1}(t+1) = \hat{A}\zeta_{k+1}(t) + \hat{A}_\tau \zeta_{k+1}(t-\tau) + \hat{B}_1 e_k(t-1) + \hat{B}_0 e_k(t) \quad (25)$$
$$e_{k+1}(t) = \hat{C}\zeta_{k+1}(t) + \hat{D}_1 e_k(t-1) + \hat{D}_0 e_k(t)$$

wherein $$\hat{A} = \begin{bmatrix} A + BK_1 & 0 \\ \Delta A + \Delta BK_1 & A + \Delta A \end{bmatrix}, \hat{A}_\tau = \begin{bmatrix} 0 & LC \\ 0 & -LC \end{bmatrix}$$
$$\hat{B}_1 = \begin{bmatrix} BK \\ \Delta BK \end{bmatrix}, \hat{B}_0 = \begin{bmatrix} BK_3 \\ \Delta BK_3 \end{bmatrix}$$
$$\hat{C} = [-C(A + \Delta A) \quad -C(B + \Delta B)K_1 - C(A + \Delta A)]$$
$$\hat{D}_1 = -C(B + \Delta B)K, \hat{D}_0 = I - C(B + \Delta B)K_3$$

step 4: performing system stability analysis and learning gain solving on the linear discrete repetitive process model;

wherein a Lyapunov function is selected as $$V(k, t) = V_1(t, k) + V_2(k, t) \quad (26)$$

$$V_1(t, k) = \zeta_{k+1}^T(t)S\zeta_{k+1}(t) + \sum_{i=1}^{\tau}\zeta_{k+1}^T(t-i)Q\zeta_{k+1}(t-i)$$

$$V_2(k, t) = e_k^T(t-1)P_1 e_k(t-1) + e_k^T(t)(P_2 - P_1)e_k(t)$$

wherein $S = \text{diag}\{S_1, S_2\} > 0$, $Q = \text{diag}\{Q_1, Q_2\} > 0$, and $P_2 > P_1 > 0$; $V_1(t,k)$ represents an energy change along a trial, and $V_2(k,t)$ represents an energy change between the trials; and increments of subfunctions are $$\Delta V_1(t, k) = \quad (27)$$
$$\zeta_{k+1}^T(t+1)S\zeta_{k+1}(t+1) - \zeta_{k+1}^T(t)(S-Q)\zeta_{k+1}(t) - \zeta_{k+1}^T(t-\tau)Q\zeta_{k+1}(t-\tau)$$
$$= H_{k+1}^T(t)\Phi_1^T S\Phi_1 H_{k+1}(t) - \zeta_{k+1}^T(t)(S-Q)\zeta_{k+1}(t) - \zeta_{k+1}^T(t-\tau)Q\zeta_{k+1}(t-\tau)$$

$$\Delta V_2(k, t) = \quad (28)$$
$$e_{k+1}^T(t)P_2 e_{k+1}(t) - e_{k+1}^T(t-1)P_1 e_k(t-1) - e_k^T(t)(P_2 - P_1)e_k(t)$$
$$= H_{k+1}^T(t)\Phi_2^T P_2 \Phi_2 H_{k+1}(t) - e_k^T(t-1)P_1 e_k(t-1) - e_k^T(t)(P_2 - P_1)e_k(t)$$

wherein $$H_{k+1}(t) = \begin{bmatrix} \zeta_{k+1}(t) \\ \zeta_{k+1}(t-\tau) \\ e_k(t-1) \\ e_k(t) \end{bmatrix},$$

$$\Phi_1 = \begin{bmatrix} \hat{A} & \hat{A}_\tau & \hat{B}_1 & \hat{B}_0 \end{bmatrix}, \Phi_2 = \begin{bmatrix} \hat{C} & 0 & \hat{D}_1 & \hat{D}_0 \end{bmatrix}$$

a total increment of the function is $$\Delta V(k, t) = \Delta V_1(t, k) + \Delta V_2(k, t) = H_{k+1}^T(t)\prod H_{k+1}(t) \quad (29)$$

wherein $$\prod = \begin{bmatrix} \hat{A} & \hat{A}_\tau & \hat{B}_1 & \hat{B}_0 \\ \hat{C} & 0 & \hat{D}_1 & \hat{D}_0 \end{bmatrix}^T \begin{bmatrix} S & 0 \\ * & P_2 \end{bmatrix} \begin{bmatrix} \hat{A} & \hat{A}_\tau & \hat{B}_1 & \hat{B}_0 \\ \hat{C} & 0 & \hat{D}_1 & \hat{D}_0 \end{bmatrix} - \begin{bmatrix} S-Q & 0 & 0 & 0 \\ * & Q & 0 & 0 \\ * & * & P_1 & 0 \\ * & * & * & P_2 - P_2 \end{bmatrix}$$

if $\Delta V(k,t) < 0$ is satisfied for all k and t, the model (25) is stable along the trials, which has an equivalent condition of $\prod < 0$; a Schur complement lemma is applied to $\prod < 0$, left and right sides of an inequality are multiplied by $\text{diag}\{I, I, S^{-1}, S^{-1}, P_2^{-1}P_2^{-1}\}$, variable substitution is performed, and it is assumed that $S_1^{-1} = W_1$, $S_2^{-1} = W_2$, $S_1^{-1}Q_1 S_1^{-1} = X_1$, $S_2^{-1}Q_2 S_2^{-1} = X_2$, $P_2^{-1}P_1 P_1^{-1} = Z_1$, $P_2^{-1} = Z_2$, $K_1 S_1^{-1} = K_1 W_1 = R_1$, $LCS_2^{-1} = LCW_2 = R$, $KP_2^{-1} = KZ_2 = R_2$, $K_3 P_2^{-1} = K_3 Z_2 = R_3$, so as to obtain the following conclusion:

for the nominal linear discrete repetitive process model with time delay described in the formula (25), if there exist matrices $W = \text{diag}\{W_1, W_2\} > 0$, $X = \text{diag}\{X_1, X_2\} > 0$, $Z_1 > 0$, $Z_2 > 0$ and R, $R_1$, $R_2$ and $R_3$ satisfying the following linear matrix inequality:

$$\Xi_1 = \begin{bmatrix} -W_1 & 0 & 0 & AW_1+BR_1 & 0 & 0 & R & BR_2 & BR_1 \\ * & -W_2 & 0 & 0 & AW_2 & 0 & -R & 0 & 0 \\ * & * & -Z_2 & -C(AW_1+BR_1) & -CAW_2 & 0 & 0 & -CBR_2 & Z_2-CBR_3 \\ * & * & * & -W_1+X_1 & 0 & 0 & 0 & 0 & 0 \\ * & * & * & * & -W_2+X_2 & 0 & 0 & 0 & 0 \\ * & * & * & * & * & -X_1 & 0 & 0 & 0 \\ * & * & * & * & * & * & X_2 & 0 & 0 \\ * & * & * & * & * & * & * & -Z_1 & 0 \\ * & * & * & * & * & * & * & * & -Z_2+Z_1 \end{bmatrix} < 0 \quad (30)$$

the model (25) is stable along the trials, and the learning gain of the update term (22) and the gain of the state observer (20) are:

$$K_1=R_1W_1^{-1},\ K_2=R_2Z_2^{-1}+R_3Z_2^{-1},\ K_3=R_3Z_2^{-1},\\ L=RW_2^{-1}C^T(CC^T)^{-1} \quad (31)$$

when the structure uncertainty of the system is considered, the Schur complement lemma is applied to Π<0, the left and right sides of the inequality are multiplied by diag$\{I,I,S^{-1},S^{-1},P_2^{-1}P_2^{-1}\}$, variable substitution is performed, and it is assumed that $S_1^{-1}=W_1$, $S_2^{-1}=W_2$, $S_1^{-1}Q_1S_1^{-1}=X_1$, $S_2^{-1}Q_2S_2^{-1}=X_2$, $P_2^{-1}P_1P_1^{-1}=Z_1$, $P_2^{-1}=Z_2$, $K_1S_1^{-1}=K_1W_1=R_1$, $LCS_2^{-1}=LCW_2=R$, $KP_2^{-1}=KZ_2=R_2$, $K_3P_2^{-1}=K_3Z_2=R_3$, so as to obtain $$\Xi_1+M\Theta N+N^T\Theta^T M^T < 0 \quad (32)$$

wherein $M=[0\ B_{11}^T\ -B_{11}^TC^T\ 0\ 0\ 0\ 0\ 0\ 0]^T$ $N=[0\ 0\ 0\ \bar{C}_{11}W_1+D_{12}R_1\ C_{11}W_2\ 0\ 0\ D_{12}R_2\ D_{12}R_3]$ $\Theta=\theta(I-D_{11}\theta)^{-1},\ \theta^T\theta \leq I$ the formula (32) is equivalent to $$\Xi_1 + \begin{bmatrix} \varepsilon^{-1} & N^T & \varepsilon M \end{bmatrix} \begin{bmatrix} I & -D_{11} \\ * & I \end{bmatrix}^{-1} \begin{bmatrix} \varepsilon^{-1}N \\ \varepsilon M^T \end{bmatrix} < 0 \quad (33)$$

wherein ε>0;
according to the Schur complement lemma, the formula (33) is described as $$\begin{bmatrix} \Xi_1 & \varepsilon^{-1}N^T & \varepsilon M \\ * & -I & D_{11} \\ * & * & -I \end{bmatrix} < 0$$

left and right sides of the above formula are multiplied by diag$\{I,\varepsilon I,\varepsilon I\}$, and $\varepsilon^2$ is replaced by ε, so as to obtain the following conclusion:

for the uncertain linear discrete repetitive process model with time delay described in the formula (25), if there exist the matrices W=diag$\{W_1,W_2\}$>0, X=diag$\{X_1,X_2\}$>0, $Z_1$>0, $Z_2$>0 and R, $R_1$, $R_2$ and $R_3$ satisfying the following linear matrix inequality:

$$\begin{bmatrix} \Xi_1 & \Xi_2 \\ * & \Xi_3 \end{bmatrix} < 0 \quad (34)$$

-continued wherein $$\Xi_2 = \begin{bmatrix} 0 & 0 & 0 & \bar{C}_{11}W_1+D_{12}R_1 & \bar{C}_{11}W_2 & 0 & 0 & D_{12}R_2 & D_{12}R_3 \\ 0 & \varepsilon B_{11}^T & -\varepsilon B_{11}^T C^T & 0 & 0 & 0 & 0 & 0 & 0 \end{bmatrix}^T$$

$$\Xi_3 = \begin{bmatrix} -\varepsilon I & \varepsilon D_{11} \\ * & -\varepsilon I \end{bmatrix}$$

the model (25) is robustly stable along the trials, and the learning gain of the update term (22) and the gain of the state observer (20) are given by the formula (31).

The present invention has the following beneficial technical effects.

In the present application, the robust ILC method for a multi-particle vehicle platoon driving system with structure uncertainty and input delay is researched; firstly, the multi-particle train dynamic equation is discretized using the finite difference method to obtain the partial recurrence equation, and then, the partial recurrence equation is transformed into the spatially interconnected system model; next, the spatially interconnected system model is transformed into the equivalent one-dimensional dynamic model using the lifting technology, and in order to compensate the input delay, the ILC law is designed based on the state observer, a controlled object is transformed into an equivalent discrete repetitive process according to the designed ILC law, sufficient conditions for the stability of the system along the trials are obtained according to a repetitive process stability theory, and a controller combination problem is converted into the linear matrix inequality. The method is simple and easy to implement, solves the problem of the delay in the output response caused by the input delay, considers the structure uncertainty of the system, and has a good control performance and robustness.

DESCRIPTION OF EMBODIMENTS

An embodiment of the present invention is further described below with reference to the drawings.

Figure 1:
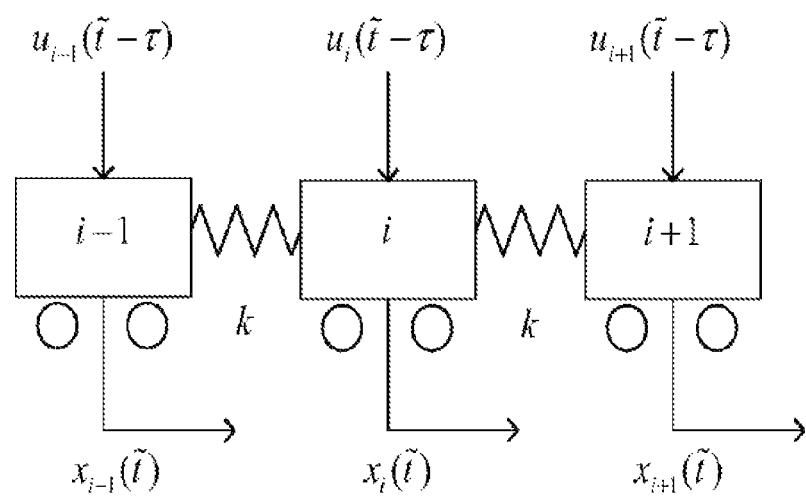
FIG. 1 is a structural diagram of a multi-particle vehicle platoon driving system in the present application.

FIG. 1 is a structural diagram of a multi-particle vehicle platoon driving system. For the dynamic equation (1) of the system, the time-delay constant is $\tau=4$; the mass of each train is m=2[kg], and the variation range is $\overline{\omega}_m=0.2$[kg]; the spring coefficient is k=2[N/m], and the variation range is $\overline{\omega}_k 0.2$[N/m]; and the sampling time is T=0.05[s].

Figure 2:
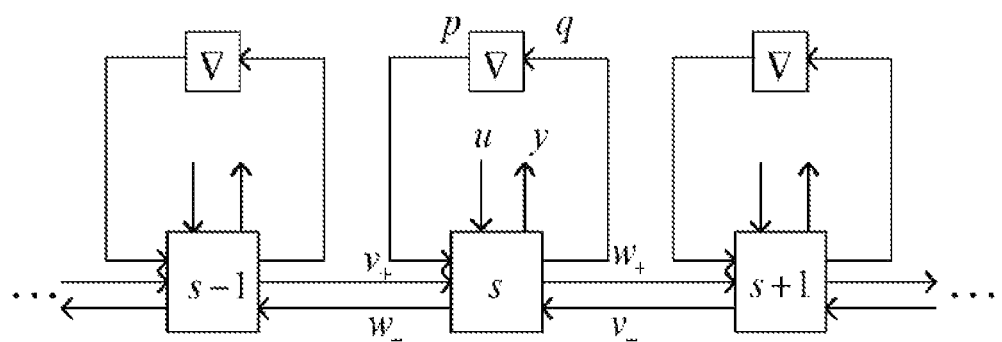
FIG. 2 is a structural diagram of a spatially interconnected system model in the present application.

FIG. 2 is a structural diagram of a spatially interconnected system model, and all parameter matrices of the model (3) are $$A_{11}^s = \begin{bmatrix} 1 & 0.05 \\ -0.1 & 1 \end{bmatrix}, A_{12}^s = \begin{bmatrix} 0 & 0 \\ 0.05 & 0.05 \end{bmatrix},$$

$$A_{21}^s = \begin{bmatrix} 1 & 0 \\ 1 & 0 \end{bmatrix}, B_{11}^s = \begin{bmatrix} 0 & 0 \\ 0.025 & 0.025 \end{bmatrix}$$

$$B_{12}^s = \begin{bmatrix} 0 \\ 0.025 \end{bmatrix}, C_{11}^s = \begin{bmatrix} -0.4 & 0 \\ -0.4 & 0 \end{bmatrix}, C_{12}^s = \begin{bmatrix} 0.2 & 0.2 \\ 0.2 & 0.2 \end{bmatrix}, C_{21}^s = [0 \quad 1]$$

$$D_{11}^s = \begin{bmatrix} 0 & 0 \\ 0.1 & -0.1 \end{bmatrix}, D_{12}^s = \begin{bmatrix} 0 \\ 0.1 \end{bmatrix}$$

Considering a multi-particle vehicle platoon driving system with three interconnected trains, and supposing that an initial condition of the system is $x_0(0,1)=x_0(0,2)=x_0(0,3)=0$, and a limited working cycle in each trial is 20 s, a speed reference trajectory of each train is $$y_r(t, 1) = \begin{cases} 0.6t & 0 \leq t \leq 5 \\ 3 & 5 < t \leq 20 \end{cases}$$

$$y_r(t, 2) = \begin{cases} 0.3t & 0 \leq t \leq 10 \\ 3 & 10 < t \leq 20 \end{cases}$$

$$y_r(t, 3) = \begin{cases} 0.2t & 0 \leq t \leq 15 \\ 3 & 15 < t \leq 20 \end{cases}$$

and a reference trajectory signal is given by a waveform generator.

The formula (25) is solved to obtain the following PD-type ILC learning gain and observer gain of a nominal system:

$$K_1 = \begin{bmatrix} 0.403 & -40.080 & -1.952 & 0.003 & 0.036 & 0.002 \\ -1.951 & 0 & 3.944 & -39.969 & -1.993 & -0.002 \\ 0.036 & 0.002 & -1.993 & 0 & 1.549 & -40.019 \end{bmatrix}$$

$$K_2 = \begin{bmatrix} 24.578 & 0.029 & -0.002 \\ 0.029 & 25.746 & 0.001 \\ -0.002 & 0.003 & 24.692 \end{bmatrix}, K_3 = \begin{bmatrix} 24.538 & 0.030 & -0.002 \\ 0.030 & 25.706 & 0.002 \\ -0.002 & 0.003 & 24.652 \end{bmatrix}$$

$$L = \begin{bmatrix} -0.009 & 0.024 & -0.006 & 0.002 & -0.006 & 0.007 \\ -0.006 & 0.002 & -0.010 & 0.029 & -0.006 & 0.002 \\ -0.006 & 0.007 & -0.006 & 0.002 & -0.009 & 0.024 \end{bmatrix}^T$$

P-type ILC learning gain and corresponding observer gain are $$K_1 = \begin{bmatrix} 0.504 & -40.100 & -1.995 & 0.008 & -0.002 & -0.001 \\ -1.995 & 0.012 & 1.788 & -40.119 & -2.006 & -0.012 \\ -0.002 & -0.001 & -2.006 & 0.007 & 0.371 & -40.108 \end{bmatrix}$$

$$K_3 = \begin{bmatrix} 25.284 & 0.006 & -0.026 \\ 0.006 & 25.238 & 0.006 \\ -0.026 & 0.006 & 25.268 \end{bmatrix}$$

$$L = \begin{bmatrix} -0.010 & 0.025 & -0.006 & 0.003 & -0.006 & 0.007 \\ -0.006 & 0.003 & -0.010 & 0.029 & -0.005 & 0.003 \\ -0.008 & 0.008 & -0.008 & 0.003 & -0.010 & 0.029 \end{bmatrix}^T$$

The above iterative learning controller is implemented by an STM32F103RCT6 chip. An input signal of the chip is collected by a BENTLY 74712 speed sensor, stored into a stm32 chip through a conditioning circuit for calculation and used to form an iterative learning update law, and a signal obtained after calculation by a CPU (Central Processing Unit) is used as the control signal $U_{k+1}(t)$ for a current trial. The control signal acts on a stepping motor DM3622 through a D/A (Digital/Analog) conversion circuit and is used for updating speeds of train particles until the given speed reference trajectory is reached.

Figure 3:
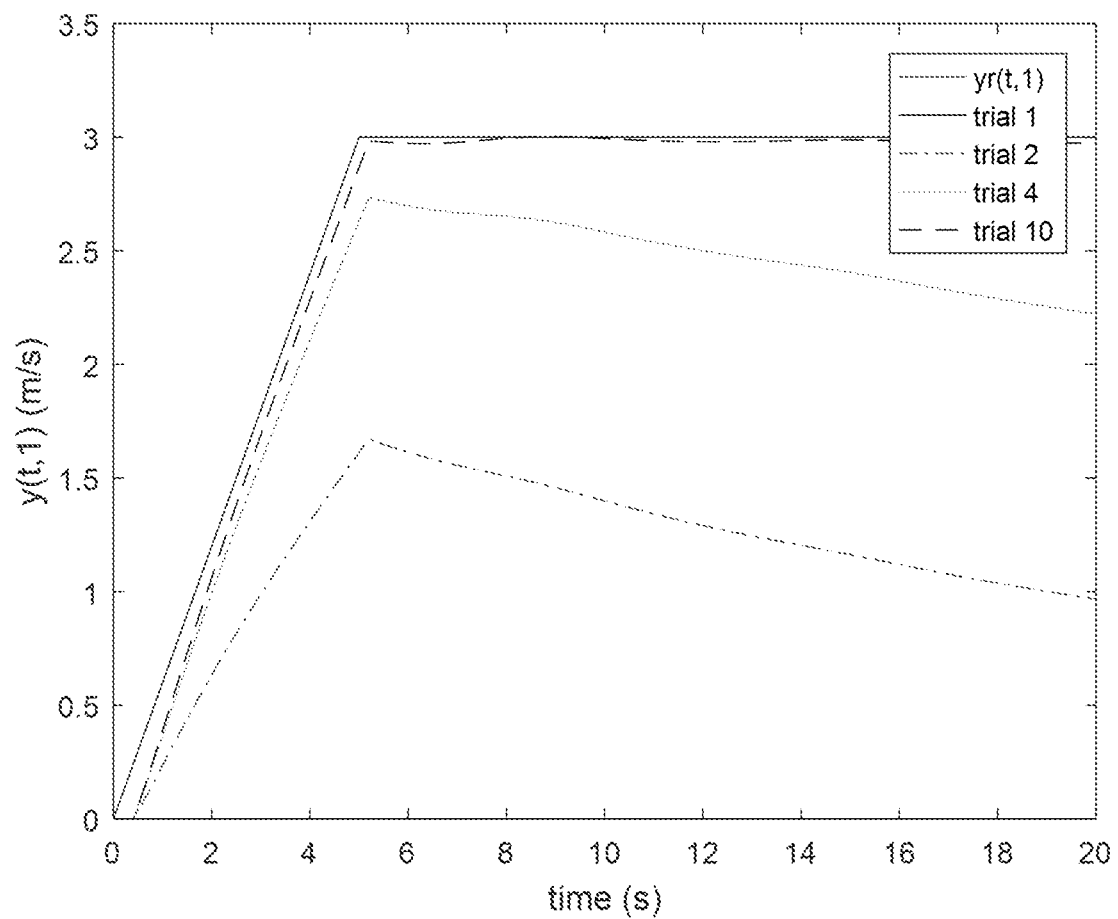
FIG. 3 is an output curve of a first train particle under a nominal situation in the present application.
Figure 4:
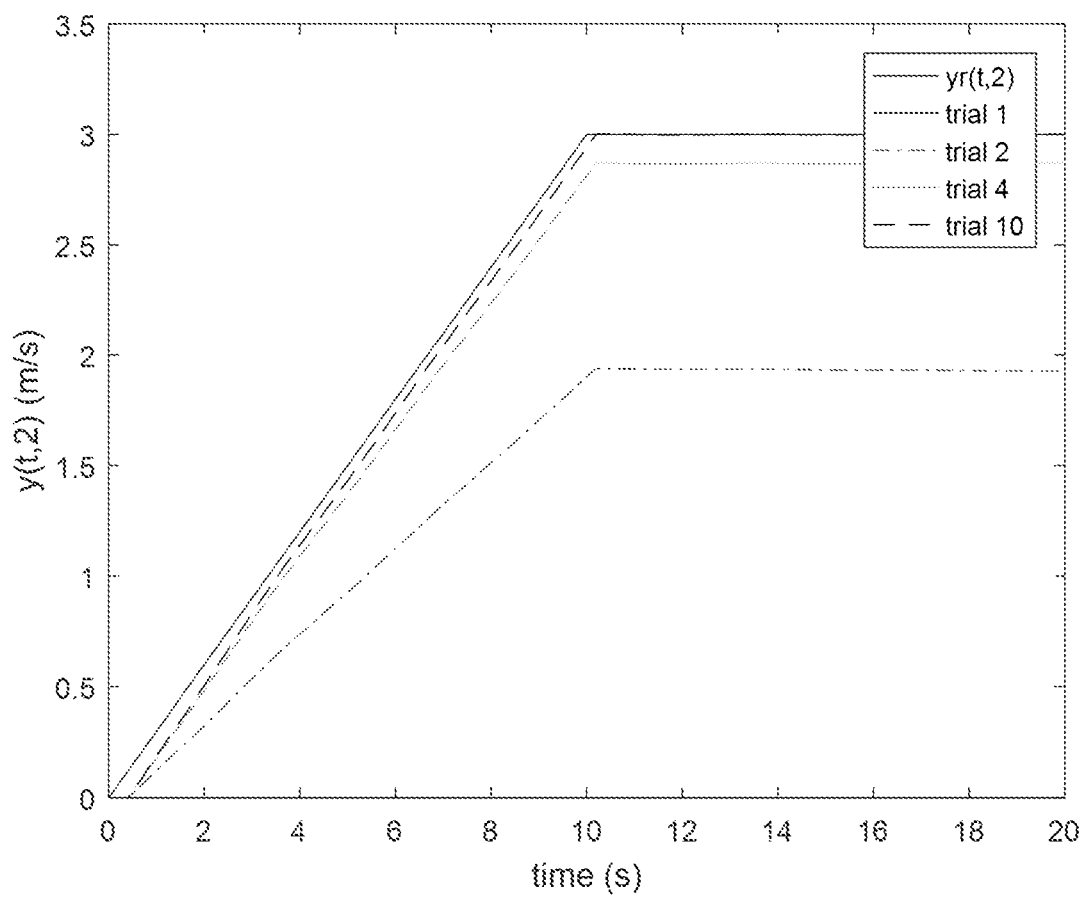
FIG. 4 is an output curve of a second train particle under the nominal situation in the present application.
Figure 5:
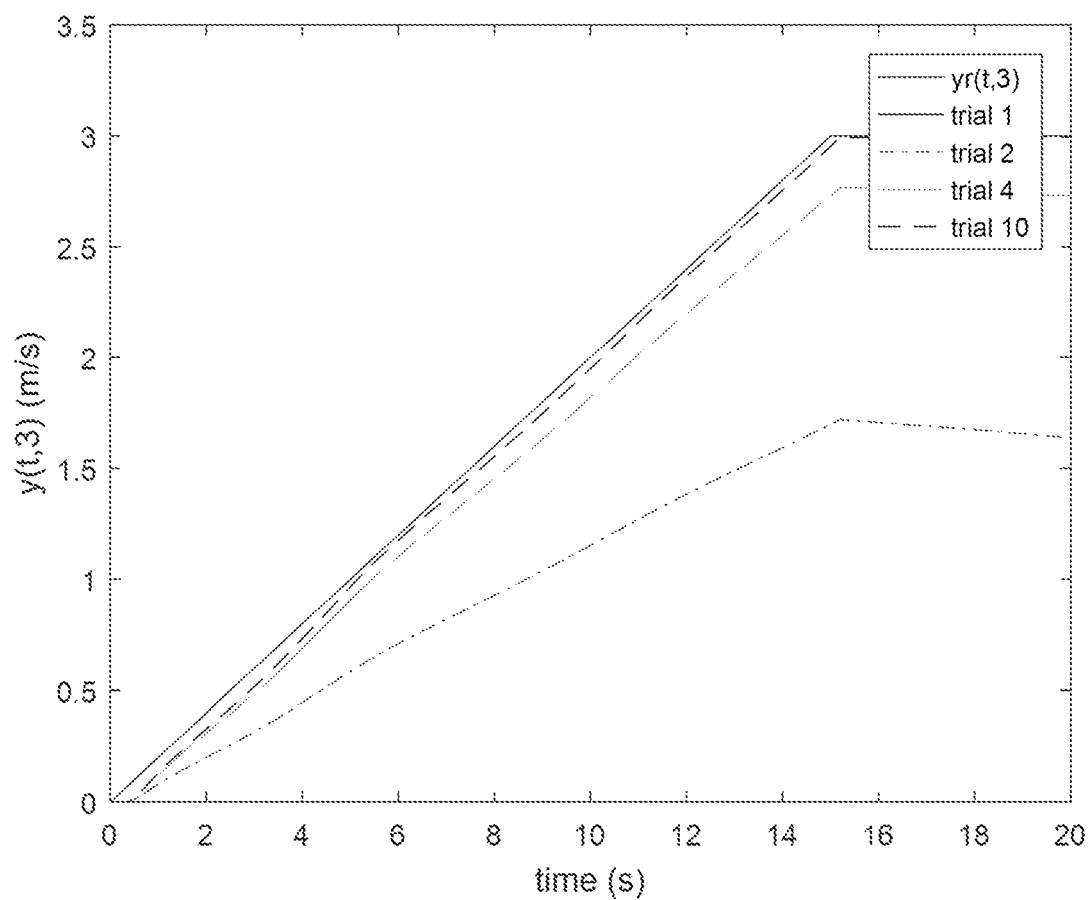
FIG. 5 is an output curve of a third train particle under the nominal situation in the present application.

FIG. 3 is an output curve of a first train particle under a nominal situation, FIG. 4 is an output curve of a second train particle under the nominal situation, and FIG. 5 is an output curve of a third train particle under the nominal situation. In order to further evaluate a tracking performance of the system, an RMS (Root-Mean-Square) error performance index is introduced:

$$\text{RMS} = \sum_{s=1}^{3} \sqrt{\frac{1}{400} \sum_{i=1}^{400} e_k^2(t, s)}$$

Figure 6:
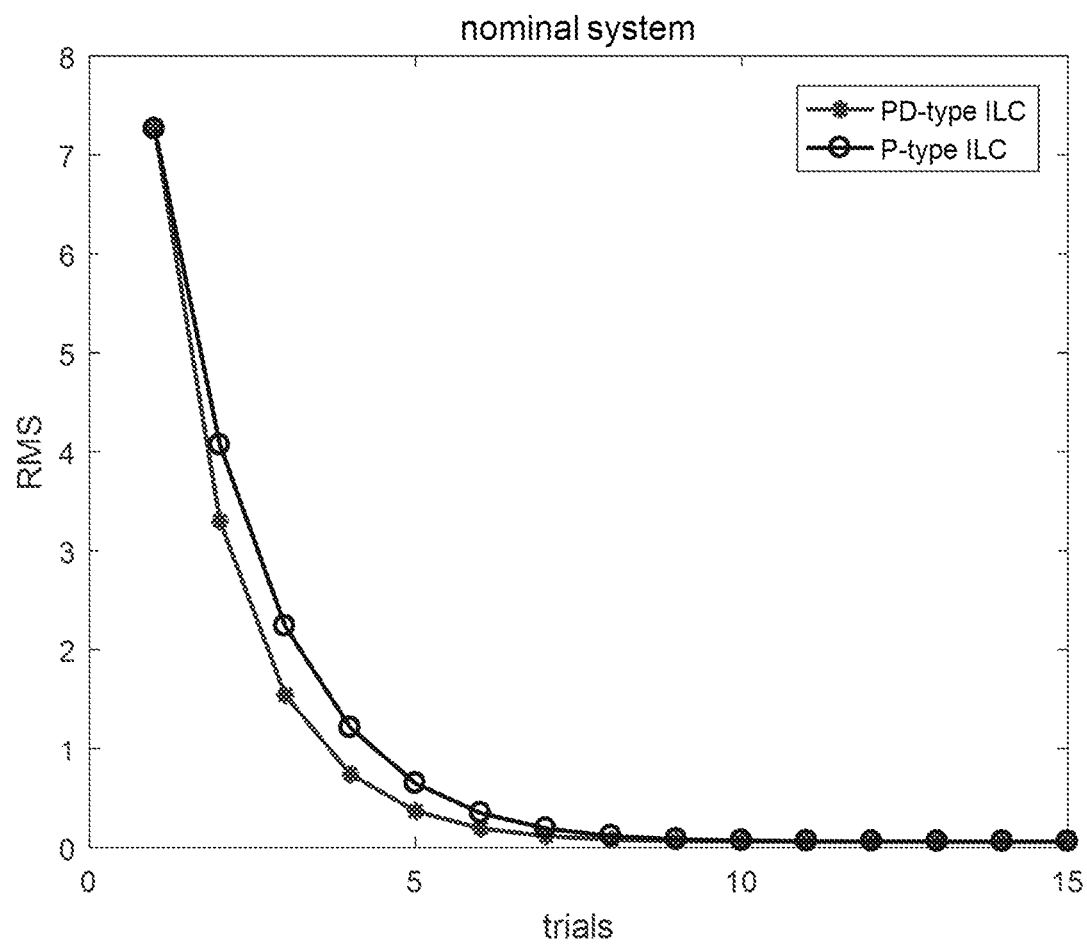
FIG. 6 is an RMS (Root-Mean-Square) contrast curve of a nominal system in the present application.

FIG. 6 is an RMS contrast curve of a nominal system, and it is observed that with the presence of an input delay constant, a state of the system after $\tau$ steps estimated by a state observer is used as feedback to advance output response of the system, so as to compensate input delay. With an increase of iterations, the control signal is updated constantly, and output of each train gradually reaches the desired speed trajectory, which proves effectiveness of the method according to the present invention. Furthermore, compared with P-type ILC, more tracking error information is used in PD-type ILC, and an RMS error converges faster along the trials, thus achieving a perfect tracking performance.

The formula (34) is solved to obtain PD-type ILC learning gain and observer gain of an uncertain system:

$$K_1 = \begin{bmatrix} 1.845 & -27.653 & -1.793 & -0.173 & -0.052 & -0.129 \\ -1.792 & -0.173 & 3.585 & -27.610 & -1.792 & -0.173 \\ -0.052 & -0.129 & -1.793 & -0.172 & 1.845 & -27.653 \end{bmatrix}$$

$$K_2 = \begin{bmatrix} 16.409 & 0.594 & -0.092 \\ 0.594 & 15.722 & 0.594 \\ -0.092 & 0.594 & 16.409 \end{bmatrix}, K_3 = \begin{bmatrix} 12.840 & 0.574 & -0.118 \\ 0.574 & 12.148 & 0.574 \\ -0.118 & 0.574 & 12.840 \end{bmatrix}$$

$$L = \begin{bmatrix} -0.001 & 0.010 & 0.001 & -0.008 & -0.003 & 0.002 \\ 0.001 & -0.008 & -0.005 & 0.020 & 0.001 & -0.008 \\ -0.003 & 0.002 & 0.001 & -0.008 & -0.001 & 0.010 \end{bmatrix}^T$$

Similarly, P-type ILC learning gain and corresponding observer gain are $$K_1 = \begin{bmatrix} 1.851 & -27.954 & -1.799 & -0.231 & -0.052 & -0.139 \\ -1.799 & -0.231 & 3.598 & -27.861 & -1.799 & -0.231 \\ -0.052 & -0.138 & -1.799 & -0.231 & 1.852 & -27.953 \end{bmatrix}$$

$$K_3 = \begin{bmatrix} 14.111 & 0.690 & -0.142 \\ 0.690 & 13.279 & 0.690 \\ -0.142 & 0.690 & 14.111 \end{bmatrix}$$

$$L = \begin{bmatrix} -0.001 & 0.008 & 0.001 & -0.008 & -0.002 & 0.002 \\ 0.001 & -0.008 & -0.004 & 0.018 & 0.001 & -0.008 \\ -0.002 & 0.002 & 0.001 & -0.008 & -0.001 & 0.008 \end{bmatrix}^T$$

Figure 7:
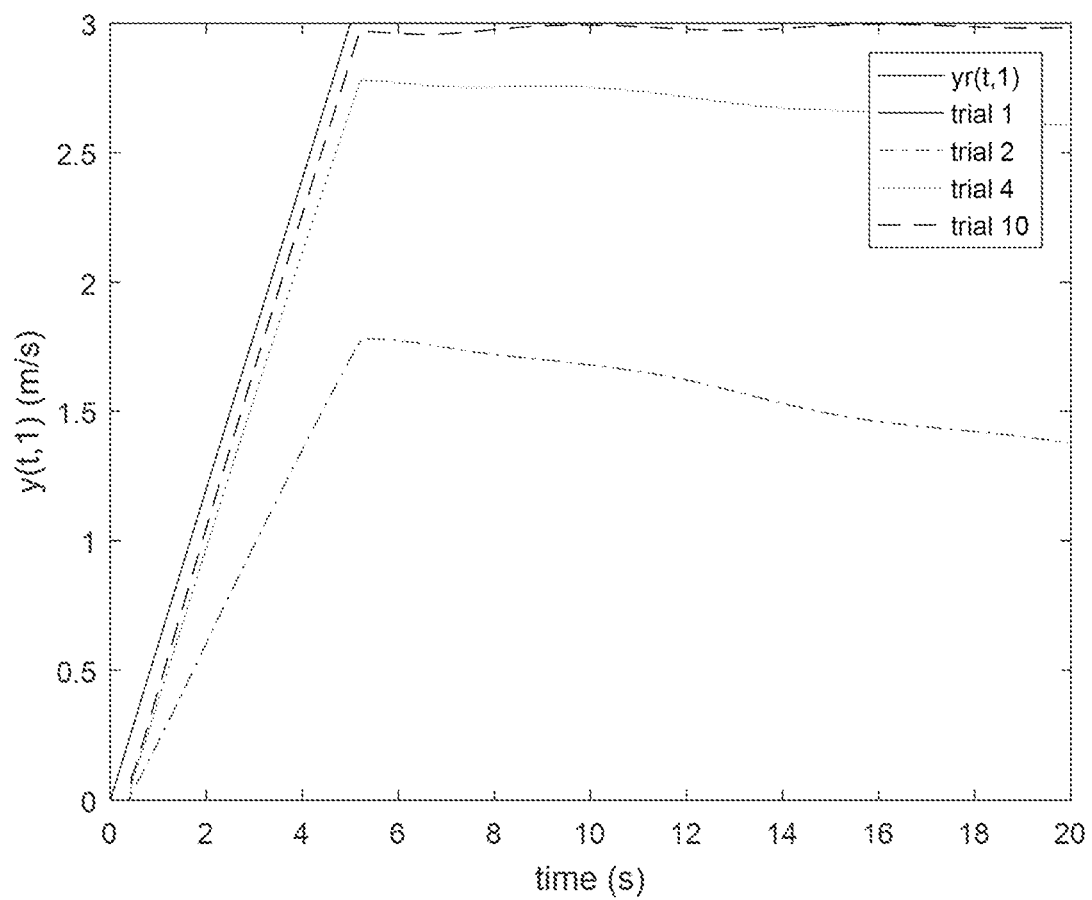
FIG. 7 is an output curve of the first train particle under an uncertain situation in the present application.
Figure 8:
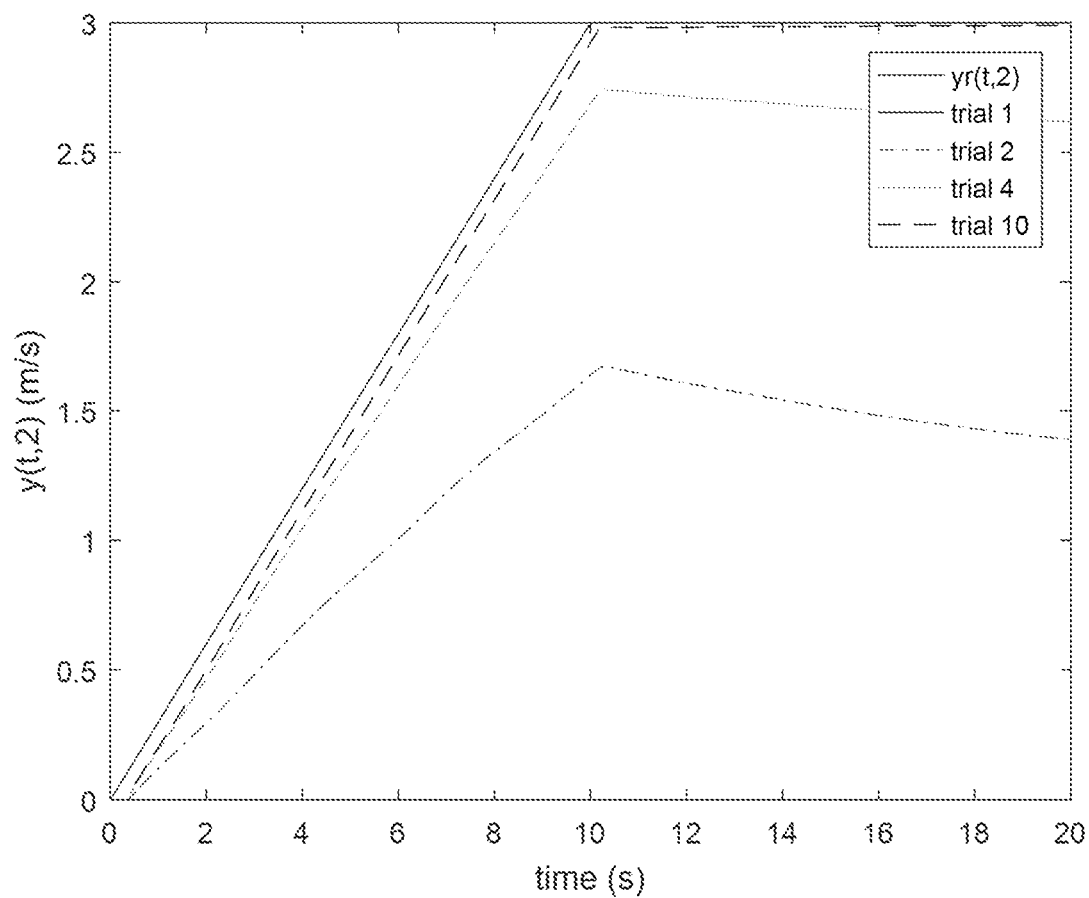
FIG. 8 is an output curve of the second train particle under the uncertain situation in the present application.
Figure 9:
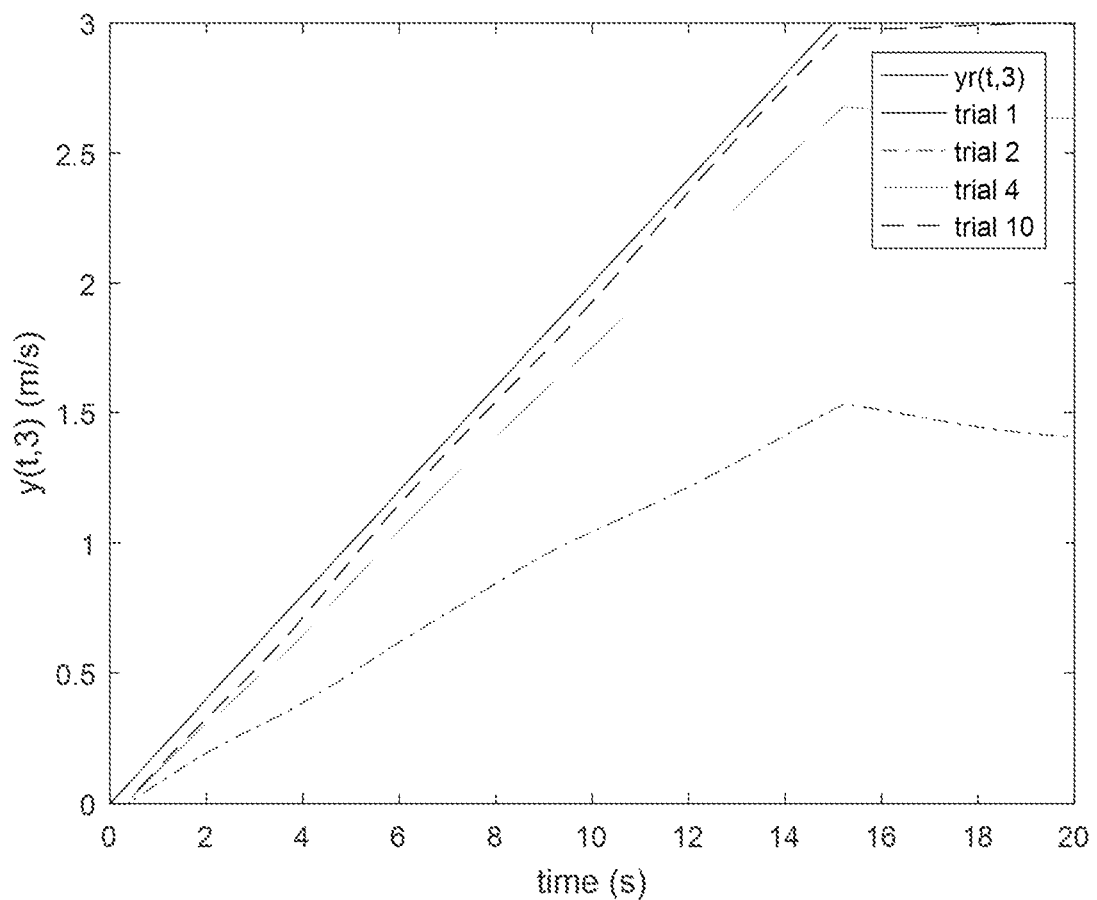
FIG. 9 is an output curve of the third train particle under the uncertain situation in the present application.
Figure 10:
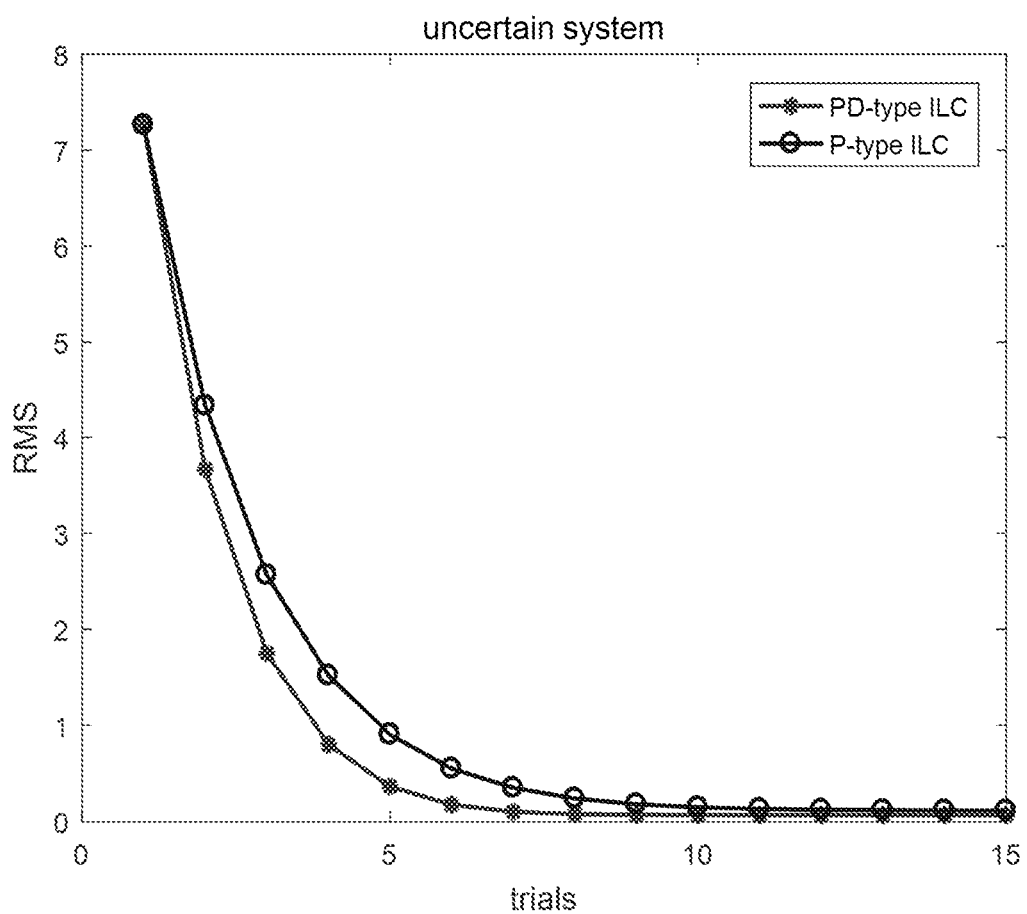
FIG. 10 is an RMS contrast curve of an uncertain system in the present application.

FIG. 7 is an output curve of the first train particle under an uncertain situation, FIG. 8 is an output curve of the second train particle under the uncertain situation, FIG. 9 is an output curve of the third train particle under the uncertain situation, and FIG. 10 is an RMS contrast curve of the uncertain system.

It is observed that with the simultaneous presence of the time-delay constant and structure uncertainty, a future state of the system is estimated by the state observer to form feedback acting on the system, such that the system outputs timely response after the time delay τ, thus improving a control process. With the increase of the iterations, the output of each train asymptotically reaches the desired speed trajectory, and a tracking error converges along the trials, which shows the effectiveness and robustness for the structure uncertainty of the system of the method according to the present invention. In addition, almost 7 trials are required for perfect tracking by the PD-type ILC, and compared with the P-type ILC, convergence time is shorter, a convergence speed is higher, and the tracking performance is better.

The above description is only a preferred embodiment of the present application, and the present invention is not limited to the above embodiment. It is to be understood that other improvements and variations directly derived or suggested to those skilled in the art without departing from the spirit and idea of the present invention should be considered to be included within the protection scope of the present invention.

What is claimed is:

1. An ILC method for a multi-particle vehicle platoon driving system, comprising:
   step 1: establishing a spatially interconnected system model of the multi-particle vehicle platoon driving system;

wherein a dynamic equation of the multi-particle vehicle platoon driving system is described as $$m\ddot{x}_i(\tilde{t}) = k(x_{i+1}(\tilde{t}) - x_i(\tilde{t})) - k(x_i(\tilde{t}) - x_{i-1}(\tilde{t})) + u_i(\tilde{t} - \tau) \quad y_i(\tilde{t}) = \dot{x}_i(\tilde{t}) \tag{1}$$

wherein $x_i(\tilde{t})$ represents a position of an ith train, $u_i(\tilde{t})$ is control input and represents traction of the train, τ is a time-delay constant caused by signal transmission, $y_i(\tilde{t})$ is measurement output and represents a speed of the train, m denotes mass of each train and has a variation range $\pm\bar{\omega}_m$, and k is a spring coefficient and has a variation range $\pm\bar{\omega}_k$;

sampling time T is selected, and the equation (1) is approximately discretized using a finite difference method; that is, $$(\dot{x}_i(\tilde{t}))_{t,s} = \frac{x_1(t+1, s) - x_1(t, s)}{T}, (\ddot{x}_i(\tilde{t}))_{t,s} = \frac{x_2(t+1, s) - x_2(t, s)}{T}$$

wherein t and s are discrete time and a train serial number respectively, and substitution of the above formula into the equation (1) gives a partial recurrence equation:

$$x_1(t+1, s) = x_1(t, s) + Tx_2(t, s) \tag{2}$$

$$x_2(t+1, s) =$$
$$-2\frac{kT}{m}x_1(t, s) + x_2(t, s) + \frac{kT}{m}x_1(t, s+1) + \frac{kT}{m}x_1(t, s-1) + \frac{T}{m}u(t-\tau, s)$$

$$y(t, s) = x_2(t, s)$$

assuming that information transferred between the trains is their position information, that is, interconnected variables are set as: $w_+(t,s) = w_-(t,s) = x_1(t,s)$, $v_+(t,s) = x_1(t,s-1)$, and $v_-(t,s) = x_1(t,s+1)$, and an output variable is set as: $y(t,s) = x_2(t,s)$, the equation (2) is transformed into an uncertain spatially interconnected system model, i.e., $$\begin{bmatrix} x(t+1, s) \\ w(t, s) \\ q(t, s) \\ y(t, s) \end{bmatrix} = \begin{bmatrix} A_{11}^s & A_{12}^s & B_{11}^s & B_{12}^s \\ A_{21}^s & 0 & 0 & 0 \\ C_{11}^s & C_{12}^s & D_{11}^s & D_{12}^s \\ C_{21}^s & 0 & 0 & 0 \end{bmatrix} \begin{bmatrix} x(t, s) \\ v(t, s) \\ p(t, s) \\ u(t-\tau, s) \end{bmatrix} \tag{3}$$

wherein $$A_{11}^s = \begin{bmatrix} 1 & T \\ -2\frac{kT}{m} & 1 \end{bmatrix}, A_{12}^s = \begin{bmatrix} 0 & 0 \\ \frac{kT}{m} & \frac{kT}{m} \end{bmatrix},$$

$$A_{21}^s = \begin{bmatrix} 1 & 0 \\ 1 & 0 \end{bmatrix}, B_{11}^s = \begin{bmatrix} 0 & 0 \\ \frac{T}{m} & -\frac{T}{m} \end{bmatrix}, B_{12}^s = \begin{bmatrix} 0 \\ \frac{T}{m} \end{bmatrix}$$

$$C_{11}^s = \begin{bmatrix} -2\bar{\omega}_k & 0 \\ -2\frac{\bar{\omega}_m k}{m} & 0 \end{bmatrix}, C_{12}^s = \begin{bmatrix} \bar{\omega}_k & \bar{\omega}_k \\ \frac{\bar{\omega}_m k}{m} & \frac{\bar{\omega}_m k}{m} \end{bmatrix},$$

$$C_{21}^s = [0 \ 1], D_{11}^s = \begin{bmatrix} 0 & 0 \\ \frac{\bar{\omega}_m}{m} & -\frac{\bar{\omega}_m}{m} \end{bmatrix}, D_{12}^s = \begin{bmatrix} 0 \\ \frac{\bar{\omega}_m}{m} \end{bmatrix}$$

in the above formula, $x(t,s) \in R^n$, $u(t,s) \in R^q$ and $y(t,s) \in R^m$ represent state, input and output variables of an sth subsystem respectively; $\tau(0 < \tau < \alpha)$ denotes the time-delay constant;

$$w(t,s) = [w_+^T(t,s) \ w_-^T(t,s)]^T$$

and $$v(t,s)=[v_+^T(t,s)\ v_-^T(t,s)]^T$$

represent interconnection between adjacent subsystems, and satisfy $$w_+(s)=v_+(s+1)$$

$$w_-(s)=v_-(s-1) \quad (4)$$

boundary conditions thereof are set as: $v_+(1)=w_-(1)=0$ and $v_-(n)=w_+(n)=0$, and n is a number of the subsystems;
p(t,s) denotes a pseudo-input channel of structure uncertainty, q(t,s) denotes a pseudo-output channel of the structure uncertainty, and $$p(t,s)=\theta_s q(t,s) \quad (5)$$

wherein an uncertainty block is:

$$\theta_s=\text{diag}\{\delta_1 I_{r_1},\ldots,\delta_f I_{r_f}\},\ \delta_i \in R,\ |\delta_i|\leq 1,\ i=1,\ldots,f;$$

$\delta_i$ describes a variation of a dynamic parameter of the system, and $I_{r_f}$ is a unit matrix with a dimension of $r_f$;
step 2: transforming the spatially interconnected system model;
wherein the model (3) is transformed into an equivalent one-dimensional dynamic model using a lifting technology, and lifting vectors are defined as follows:
$X(t)=[x(t,1)^T, x(t,2)^T, \ldots, x(t,n)^T]^t$
$V(t)=[v(t,1)^T, v(t,2)^T, \ldots, v(t,n)^T]^t$
$W(t)=[w(t,1)^T, w(t,2)^T, \ldots, w(t,n)^T]^t$
$P(t)=[p(t,1)^T, p(t,2)^T, \ldots, p(t,n)^T]^t$
$Q(t)=[q(t,1)^T, q(t,2)^T, \ldots, q(t,n)^T]^t$
$U(t-\tau)=[u(t-\tau,1)^T, u(t-\tau,2)^T, \ldots, u(t-\tau,n)^T]^T$
$Y(t)=[y(t,1)^T, y(t,2)^T, \ldots, y(t,n)^T]^t$
then, the whole uncertain spatially interconnected system model can be equivalently described by the following model:

$$\begin{bmatrix} X(t+1) \\ W(t) \\ Q(t) \\ Y(t) \end{bmatrix} = \begin{bmatrix} A_{11} & A_{12} & B_{11} & B_{12} \\ A_{21} & 0 & 0 & 0 \\ C_{11} & C_{12} & D_{11} & D_{12} \\ C_{21} & 0 & 0 & 0 \end{bmatrix} \begin{bmatrix} X(t) \\ V(t) \\ P(t) \\ U(t-\tau) \end{bmatrix} \quad (6)$$

wherein $A_{11} = \text{diag}\{A_{11}^1, \ldots, A_{11}^n\}$, $A_{12} = \text{diag}\{A_{12}^1, \ldots, A_{12}^n\}$, $A_{21} = \text{diag}\{A_{21}^1, \ldots, A_{21}^n\}$ $B_{11} = \text{diag}\{B_{11}^1, \ldots, B_{11}^n\}$, $B_{12} = \text{diag}\{B_{12}^1, \ldots, B_{12}^n\}$, $C_{11} = \text{diag}\{C_{11}^1, \ldots, C_{11}^n\}$ $C_{12} = \text{diag}\{C_{12}^1, \ldots, C_{12}^n\}$, $C_{21} = \text{diag}\{C_{21}^1, \ldots, C_{21}^n\}$, $D_{11} = \text{diag}\{D_{11}^1, \ldots, D_{11}^n\}$ $D_{12} = \text{diag}\{D_{12}^1, \ldots, D_{12}^n\}$ the model (6) contains the interconnected variables, and therefore, the model (6) is required to be further simplified;
based on an interconnection characteristic of the formula (4) and the boundary conditions thereof, an equation relationship between the interconnected variables is obtained:

$$W(t)=\eta V(t) \quad (7)$$

wherein $\eta$ is a permutation matrix unrelated to time t;
the formula (7) is substituted into (6) to obtain $$V(t)=\eta^{-1}A_{21}X(t) \quad (8)$$

and then, the formula (8) is substituted into (6) to eliminate the interconnected variables W(t) and V(t), so as to obtain the following equivalent uncertain model:

$$\begin{bmatrix} X(t+1) \\ Q(t) \\ Y(t) \end{bmatrix} = \begin{bmatrix} \overline{A}_{11} & B_{11} & B_{12} \\ \overline{C}_{11} & D_{11} & D_{12} \\ C_{21} & 0 & 0 \end{bmatrix} \begin{bmatrix} X(t) \\ P(t) \\ U(t-\tau) \end{bmatrix} \quad (9)$$

wherein $\overline{A}_{11} = A_{11} + A_{12}\eta^{-1}A_{21}$ $\overline{C}_{11} = C_{11} + C_{12}\eta^{-1}A_{21}$ according to the formula (5), the following formula is obtained:

$$P(t)=\theta Q(t) \quad (10)$$

wherein the uncertainty block is: $\theta=\text{diag}\{\theta_1, \ldots, \theta_n\}$, $\theta_i \leq I$, $i=1, \ldots, n$;
the formula (10) is substituted into (9) to obtain $$Q(t)=(I-D_{11}\theta)^{-1}(\overline{C}_{11}X(t)+D_{12}U(t-\tau)) \quad (11)$$

then, the formula (11) is substituted into (9) to eliminate uncertainty variables P(t) and Q(t) using an elimination method, so as to obtain a general-form state space model:

$$X(t+1)=(A+\Delta A)X(t)+(B+\Delta B)U(t-\tau)\ Y(t)=CX(t) \quad (12)$$

wherein $A=\overline{A}_{11},\ B=B_{12},\ C=C_{21}$ $\Delta A=B_{11}\theta(I-D_{11}\theta)^{-1}\overline{C}_{11}$ $\Delta B=B_{11}\theta(I-D_{11}\theta)^{-1}D_{12}$ step 3: designing an ILC law based on a state observer;
wherein the state space model (12) is described as an ILC structure form:

$$X_{k+1}(t+1)=(A+\Delta A)X_{k+1}(t)+(B+\Delta B)U_{k+1}(t-\tau)$$
$$Y_{k+1}(t)=CX_{k+1}(t) \quad (13)$$

wherein k+1 represents a current operation trial of the system, $t \in [0,\alpha]$ denotes a limited working cycle of each trial of the system, and the input-delay constant satisfies a condition: $\tau<\alpha$;
then, the ILC law is expressed as $$U_{k+1}(t)=U_k(t)+r_{k+1}(t) \quad (14)$$

the current control signal $U_{k+1}(t)$ is equal to the control signal $U_k(t)$ of a previous trial plus the update term $r_{k+1}(t)$ which is calculated from previous error information;
a system tracking error in a (k+1)th trial is $$e_{k+1}(t)=Y_r(t)-Y_{k+1}(t) \quad (15)$$

wherein $Y_r(t)$ is a desired output trajectory;
considering delay in output response, the tracking error is re-described as $$e_{k+1}(t)=Y_r(t-\tau)-Y_{k+1}(t) \quad (16)$$

a state error vector is introduced:

$$\overline{X}_{k+1}(t+1)=X_{k+1}(t)-X_k(t) \quad (17)$$

assuming that $Y_r(0)=Y_k(0)=CX_k(0)$, and $\overline{X}_k(0)=0$, that is, the system is returned to a same initial state in each trial, $$\overline{X}_{k+1}(t+1) = X_{k+1}(t) - X_k(t) \quad (18)$$
$$= (A + \Delta A)[X_{k+1}(t-1) - X_{k+1}(t-1)] +$$
$$(B + \Delta B)[U_{k+1}(t-1-\tau) - U_k(t-1-\tau)]$$
$$= (A + \Delta A)\overline{X}_{k+1}(t) + (B + \Delta B)r_{k+1}(t-1-\tau)$$

and $$e_{k+1}(t) = Y_r(t-\tau) - Y_{k+1}(t) \quad (19)$$
$$= e_k(t) - C[X_{k+1}(t) - X_k(t)]$$
$$= -C(A + \Delta A)\overline{X}_{k+1}(t) - C(B + \Delta B)r_{k+1}(t-1-\tau) + e_k(t)$$

in order to compensate input delay, the following state observer is constructed based on output information in the current trial:

$$\tilde{X}_{k+1}(t+1) = A\tilde{X}_{k+1}(t) + Br_{k+1}(t-1) + L[\overline{Y}_{k+1}(t) - \tilde{Y}_{k+1}(t-\tau)] \quad (20)$$

wherein $\overline{Y}_{k+1}(t) = Y_{k+1}(t-1) - Y_k(t-1) = C\overline{X}_{k+1}(t)$, and $\tilde{X}_{k+1}(t)$ is a $\tau$-step ahead prediction of the state $\overline{X}_{k+1}(t)$; that is, $\tilde{X}_{k+1}(t)$ is an estimation value of $\overline{X}_{k+1}(t+\tau)$; and L is observer gain to be designed;

an observation error is defined as $$\tilde{e}_{k+1}(t) = \overline{X}_{k+1}(t) - \tilde{X}_{k+1}(t-\tau) \quad (21)$$

it is assumed that the update term in the ILC law (14) is $$r_{k+1}(t) = K_1 \tilde{X}_{k+1}(t+1) + K_2 e_k(t+\tau) + K_3(e_k(t+1+\tau) - e_k(t+\tau)) \quad (22)$$

wherein $K_1$, $K_2$ and $K_3$ are learning gain to be designed; the update term is formed by state feedback information and PD-type previous tracking error information, and when the learning gain $K_2$ is equal to $K_3$, the formula (22) is simplified to P-type ILC;

(22) is substituted into (20) to obtain $$\tilde{X}_{k+1}(t+1-\tau) = (A + BK_1)\tilde{X}_{k+1}(t-\tau) + \quad (23)$$
$$LC\tilde{e}_{k+1}(t-\tau) + B(K_2 - K_3)e_k(t-1) + BK_3 e_k(t) \text{ and}$$

$$\tilde{e}_{k+1}(t+1) = \overline{X}_{k+1}(t+1) - \tilde{X}_{k+1}(t+1-\tau) \quad (24)$$
$$= (\Delta A + \Delta BK_1)\tilde{X}_{k+1}(t-\tau) + (A + \Delta A)\tilde{e}_{k+1}(t) -$$
$$LC\tilde{e}_{k+1}(t-\tau) + \Delta B(K_2 - K_3)e_k(t-1) + \Delta BK_3 e_k(t)$$

it is assumed that $\zeta_{k+1}(t) = [\tilde{X}_{k+1}{}^T(t-\tau) \ \tilde{e}_{k+1}{}^T(t)]^T$, and $K = K_2 - K_3$, so as to obtain the following linear discrete repetitive process model with time delay:

$$\zeta_{k+1}(t+1) = \hat{A}\zeta_{k+1}(t) + \hat{A}_\tau \zeta_{k+1}(t-\tau) + \hat{B}_1 e_k(t-1) + \hat{B}_0 e_k(t) \quad (25)$$
$$e_{k+1}(t) = \hat{C}\zeta_{k+1}(t) + \hat{D}_1 e_k(t-1) + \hat{D}_0 e_k(t)$$

wherein $$\hat{A} = \begin{bmatrix} A + BK_1 & 0 \\ \Delta A + \Delta BK_1 & A + \Delta A \end{bmatrix}, \hat{A}_\tau = \begin{bmatrix} 0 & LC \\ 0 & -LC \end{bmatrix}$$
$$\hat{B}_1 = \begin{bmatrix} BK \\ \Delta BK \end{bmatrix}, \hat{B}_0 = \begin{bmatrix} BK_3 \\ \Delta BK_3 \end{bmatrix}$$

-continued
$$\hat{C} = [-C(A + \Delta A) - C(B + \Delta B)K_1 - C(A + \Delta A)]$$
$$\hat{D}_1 = -C(B + \Delta B)K, \hat{D}_0 = I - C(B + \Delta B)K_3$$

step 4: performing system stability analysis and learning gain solving on the linear discrete repetitive process model;

wherein a Lyapunov function is selected as $$V(k, t) = V_1(t, k) + V_2(k, t) \quad (26)$$
$$V_1(t, k) = \zeta_{k+1}^1(t) S \zeta_{k+1}(t) + \sum_{i=1}^{t} \zeta_{k+1}^T(t-i) Q \zeta_{k+1}(t-i)$$
$$V_2(k, t) = e_k^T(t-1) P_1 e_k(t-1) + e_k^T(t)(P_2 - P_1) e_k(t)$$

wherein $S = \text{diag}\{S_1, S_2\} > 0$, $Q = \text{diag}\{Q_1, Q_2\} > 0$, and $P_2 > P_1 > 0$; $V_1(t,k)$ represents an energy change along a trial, and $V_2(k,t)$ represents an energy change between the trials; and increments of subfunctions are $$\Delta V_1(t, k) = \quad (27)$$
$$\zeta_{k+1}^T(t+1) S \zeta_{k+1}(t+1) - \zeta_{k+1}^T(t)(S-Q)\zeta_{k+1}(t) - \zeta_{k+1}^T(t-\tau) Q \zeta_{k+1}(t-\tau)$$
$$= H_{k+1}^T(t) \Phi_1^T S \Phi_1 H_{k+1}(t) - \zeta_{k+1}^T(t)(S-Q)\zeta_{k+1}(t) - \zeta_{k+1}^T(t-\tau) Q \zeta_{k+1}(t-\tau)$$

$$\Delta V_2(k, t) = e_{k+1}^T(t) P_2 e_{k+1}(t) - e_k^T(t-1) P_1 e_k(t-1) - e_k^T(t)(P_2 - P_1) e_k(t) \quad (28)$$
$$= H_{k+1}^T(t) \Phi_2^T P_2 \Phi_2 H_{k+1}(t) - e_k^T(t-1) P_1 e_k(t-1) - e_k^T(t)(P_2 - P_1) e_k(t)$$

wherein $$H_{k+1}(t) = \begin{bmatrix} \zeta_{k+1}(t) \\ \zeta_{k+1}(t-\tau) \\ e_k(t-1) \\ e_k(t) \end{bmatrix}, \Phi_1 = [\hat{A} \ \hat{A}_\tau \ \hat{B}_1 \ \hat{B}_0], \Phi_2 = [\hat{C} \ 0 \ \hat{D}_1 \ \hat{D}_0]$$

a total increment of the function is $$\Delta V(k, t) = \Delta V_1(t, k) + \Delta V_2(k, t) = H_{k+1}^T(t) \prod H_{k+1}(t) \quad (29)$$

wherein $$\prod = \begin{bmatrix} \hat{A} & \hat{A}_\tau & \hat{B}_1 & \hat{B}_0 \\ \hat{C} & 0 & \hat{D}_1 & \hat{D}_0 \end{bmatrix}^T \begin{bmatrix} S & 0 \\ * & P_2 \end{bmatrix} \begin{bmatrix} \hat{A} & \hat{A}_\tau & \hat{B}_1 & \hat{B}_0 \\ \hat{C} & 0 & \hat{D}_1 & \hat{D}_0 \end{bmatrix} - \begin{bmatrix} S-Q & 0 & 0 & 0 \\ * & Q & 0 & 0 \\ * & * & P_1 & 0 \\ * & * & * & P_2 - P_1 \end{bmatrix}$$

if $\Delta V(k,t) < 0$ is satisfied for all k and t, the model (25) is stable along the trials, which has an equivalent condition of $\Pi < 0$; a Schur complement lemma is applied to $\Pi < 0$, left and right sides of an inequality are multiplied by $\text{diag}\{I, I, S^{-1}, S^{-1}, P_2^{-1} P_2^{-1}\}$, variable substitution is performed, and it is assumed that $S_1^{-1} = W_1$, $S_2^{-1} = W_2$, $S_1^{-1} Q_1 S_1^{-1} = X_1$, $S_2^{-1} Q_2 S_2^{-1} = X_2$, $P_2^{-1} P_1 P_1^{-1} = Z_1$, $P_2^{-1} = Z_2$, $K_1 S_1^{-1} = K_1 W_1 = R_1$, $LCS_2^{-1} = LCW_2 = R$, $KP_2^{-1} = KZ_2 = R_2$, $K_3 P_2^{-1} = K_3 Z_2 = R_3$, so as to obtain the following conclusion:

for the nominal linear discrete repetitive process model with time delay described in the formula (25), if there exist matrices $W = \text{diag}\{W_1, W_2\} > 0$, $X = \text{diag}\{X_1, X_2\} > 0$, $Z_1 > 0$, $Z_2 > 0$ and R, $R_1$, $R_2$ and $R_3$ satisfying the following linear matrix inequality:

$$\Xi_1 = \begin{bmatrix} -W_1 & 0 & 0 & AW_1+BR_1 & 0 & 0 & R & BR_2 & BR_1 \\ * & -W_2 & 0 & 0 & AW_2 & 0 & -R & 0 & 0 \\ * & * & -Z_2 & -C(AW_1+BR_1) & -CAW_2 & 0 & 0 & -CBR_2 & Z_2-CBR_3 \\ * & * & * & -W_1+X_1 & 0 & 0 & 0 & 0 & 0 \\ * & * & * & * & -W_2+X_2 & 0 & 0 & 0 & 0 \\ * & * & * & * & * & -X_1 & 0 & 0 & 0 \\ * & * & * & * & * & * & -X_2 & 0 & 0 \\ * & * & * & * & * & * & * & -Z_1 & 0 \\ * & * & * & * & * & * & * & 0 & -Z_2+Z_1 \end{bmatrix} < 0 \quad (30)$$

the model (25) is stable along the trials, and the learning gain of the update term (22) and the gain of the state observer (20) are:

$$K_1 = R_1 W_1^{-1},\ K_2 = R_2 Z_2^{-1} + R_3 Z_2^{-1},\ K_3 = R_3 Z_2^{-1},$$
$$L = R W_2^{-1} C^T (CC^T)^{-1} \quad (31)$$

when the structure uncertainty of the system is considered, the Schur complement lemma is applied to $\Pi<0$, the left and right sides of the inequality are multiplied by $\text{diag}\{I,I,S^{-1},S^{-1},P_2^{-1},P_2^{-1}\}$, variable substitution is performed, and it is assumed that $S_1^{-1}=W_1$, $S_2^{-1}=W_2$, $S_1^{-1}Q_1 S_1^{-1}=X_1$, $S_2^{-1}Q_2 S_2^{-1}=X_2$, $P_2^{-1}P_1 P_1^{-1}=Z_1$, $P_2^{-1}=Z_2$, $K_1 S_1^{-1}=K_1 W_1=R_1$, $LCS_2^{-1}=LCW_2=R$, $KP_2^{-1}=KZ_2=R_2$, $K_3 P_2^{-1}=K_3 Z_2=R_3$, so as to obtain $$\Xi_1 + M\Theta N + N^T \Theta^T M^T < 0 \quad (32)$$

wherein $$M = [0\ B_{11}^T\ -B_{11}^T C^T\ 0\ 0\ 0\ 0\ 0\ 0]^T$$
$$N = [0\ 0\ 0\ \overline{C}_{11} W_1 + D_{12} R_1\ C_{11} W_2\ 0\ 0\ D_{12} R_2\ D_{12} R_3]$$
$$\Theta = \theta(I - D_{11}\theta)^{-1},\ \theta^T \theta \leq I$$

the formula (32) is equivalent to $$\Xi_1 + \begin{bmatrix} \varepsilon^{-1} & N^T & \varepsilon M \end{bmatrix} \begin{bmatrix} I & -D_{11} \\ * & I \end{bmatrix}^1 \begin{bmatrix} \varepsilon^{-1} N \\ \varepsilon M^T \end{bmatrix} < 0 \quad (33)$$

wherein $\varepsilon > 0$;

according to the Schur complement lemma, the formula (33) is described as $$\begin{bmatrix} \Xi_1 & \varepsilon^1 N^T & \varepsilon M \\ * & -I & D_{11} \\ * & * & -I \end{bmatrix} < 0$$

left and right sides of the above formula are multiplied by $\text{diag}\{I,\varepsilon I,\varepsilon I\}$, and $\varepsilon^2$ is replaced by $\varepsilon$, so as to obtain the following conclusion:

for the uncertain linear discrete repetitive process model with time delay described in the formula (25), if there exist the matrices $W = \text{diag}\{W_1, W_2\} > 0$, $X = \text{diag}\{X_1, X_2\} > 0$, $Z_1 > 0$, $Z_2 > 0$ and $R$, $R_1$, $R_2$ and $R_3$ satisfying the following linear matrix inequality:

$$\begin{bmatrix} \Xi_1 & \Xi_2 \\ * & \Xi_3 \end{bmatrix} < 0 \quad (34)$$

wherein $$\Xi_2 = \begin{bmatrix} 0 & 0 & 0 & \overline{C}_{11} W_1 + D_{12} R_1 & \overline{C}_{11} W_2 & 0 & 0 & D_{12} R_2 & D_{12} R_3 \\ 0 & \varepsilon B_{11}^T & -\varepsilon B_{11}^T C^T & 0 & 0 & 0 & 0 & 0 & 0 \end{bmatrix}^T$$

$$\Xi_3 = \begin{bmatrix} -\varepsilon I & \varepsilon D_{11} \\ * & -\varepsilon I \end{bmatrix}$$

the model (25) is robustly stable along the trials, and the learning gain of the update term (22) and the gain of the state observer (20) are given by the formula (31);

step 5: giving specific parameters of the multi-particle vehicle platoon driving system, determining the learning gain of the ILC law and the corresponding observer gain, applying the control signal of the current trial to the ILC state space model to obtain the output of the current trial, and then repeatedly adjusting and controlling the ILC law to allow the output of each train of the vehicle platoon driving system to asymptotically reach the desired speed trajectory.

\* \* \* \* \*